United States Patent [19]
Viale

[11] 4,356,563
[45] Oct. 26, 1982

[54] AUTOMATIC DIGITAL TELEPHONE EXCHANGE

[75] Inventor: Ernesto Viale, Turin, Italy

[73] Assignee: CSELT - Centro Studi e Laboratori Telecomunicazioni S.P.A., Turin, Italy

[21] Appl. No.: 275,020

[22] Filed: Jun. 18, 1981

Related U.S. Application Data

[63] Continuation-in-part of Ser. No. 128,519, Mar. 10, 1980, abandoned.

[30] Foreign Application Priority Data

Mar. 15, 1979 [IT] Italy ............................... 67544 A/79

[51] Int. Cl.³ .................... H04Q 3/54; H04Q 11/04
[52] U.S. Cl. .................................. 370/58; 179/18 EE
[58] Field of Search ............... 179/18 EE, 18 ES; 370/58, 112, 113; 178/2 R, 3

[56] References Cited
U.S. PATENT DOCUMENTS

3,974,343 8/1976 Cheney et al. ............... 179/18 EE
4,256,926 3/1981 Pitroda et al. ............... 179/18 EE

*Primary Examiner*—Thomas A. Robinson
*Attorney, Agent, or Firm*—Karl F. Ross

[57] ABSTRACT

A digitally operating telephone exchange, especially one serving an area of low subscriber density, comprises a multiplicity of control units of substantially identical structure programmed to carry out different functions in the establishment and termination of communication among associated subscriber stations. The several control units communicate with one another, and with the subscriber stations, through a common PCM coupling network with the aid of an access unit also having a similar structure. One control unit dialogues with a higher-ranking central office for communication with subscriber stations outside the area served by the exchange.

5 Claims, 7 Drawing Figures

AUTOMATIC DIGITAL TELEPHONE EXCHANGE

CROSS-REFERENCE TO RELATED APPLICATION

This is a continuation-in-part of my copending application Ser. No. 128,519 filed Mar. 10, 1980 and now abandoned.

FIELD OF THE INVENTION

My present invention relates to an automatic digital telephone exchange and, more particularly, to equipment in such an exchange for the control of telephone traffic in an area of low subscriber density.

BACKGROUND OF THE INVENTION

An automatic exchange serving widely scattered subscriber stations—even in a large rural area—need not have the capacity of central offices located in high-density regions, yet the requirements for high operating efficiency and minimum interruption of service in the event of a malfunction are the same. Since such an exchange frequently does not have skilled personnel immediately available, a faulty condition of a particular piece of equipment calls for an automatic changeover to an alternate device in order to prevent any breakdown of the system until the defect can be remedied. Economic considerations, of course, limit the extent to which individual components can be duplicated for standby purposes.

OBJECT OF THE INVENTION

The object of my present invention, therefore, is to provide means in such an exchange for insuring continuity of sevice with a limited number of spare parts and allowing semiskilled personnel to perform temporary maintenance operations for the purpose of minimizing the effect of a malfunction upon the system until repairs can be instituted.

SUMMARY OF THE INVENTION

I have found, in accordance with my present invention, that this object can be realized by delegating the tasks of establishing and terminating a telephone connection between a local subscriber and another (local or remote) station to a set of substantially identical control units assigned to a subgroup of subscriber stations in a group of such stations served by a particular exchange, these control units being programmed to carry out different but mutually complementary operations. The control units associated with any subgroup of stations have access to a common PCM coupling network which can also communicate with the associated stations and with terminal means available to the entire group for establishing connections to a higher-ranking central office handling long-distance calls. There is further provided for each set of control units, and thus for each subgroup of subscriber stations, an access unit responsive to signals from the associated control units for satisfying their requests for connection to the common coupling network.

Pursuant to a more particular feature of my invention, each control unit comprises a central processor provided with a program memory and storage means for incoming and outgoing messages. The operations of the program memory and of the storage means are timed by command signals from a synchronizing unit, common to all control units, so as to take place during certain time intervals or channels allotted to each unit in a recurrent PCM frame.

The several mutually complementary control units of a set need to differ from one another only in their stored programs and, possibly, in the layout of a respective logic network performing special functions, e.g. the recognition of dial pulses emitted in a multifrequency code by a calling subscriber with the aid of a pushbutton-type selector.

Thus, each control unit may be part of a small plurality of identically programmed units operating concurrently in a "hot standby" mode so as to be instantly available as replacements for a malfunctioning active unit. When maintenance personnel is alerted by an alarm signal indicating such a malfunction, an as yet undifferentiated spare unit can be quickly supplied with the necessary program and the proper logic network, if required, to serve as an alternate for the recently activated standby unit. In this way, the integrity of the exchange equipment with full switchover capacity is preserved. Where greater redundancy is economically justified as otherwise essential, some or all of the control units of a set may be provided with more than one "hot" standby.

BRIEF DESCRIPTION OF THE DRAWING

The above and other features of my invention will now be described in detail with reference to the accompanying drawing in which.

SPECIFIC DESCRIPTION

Figure 1:
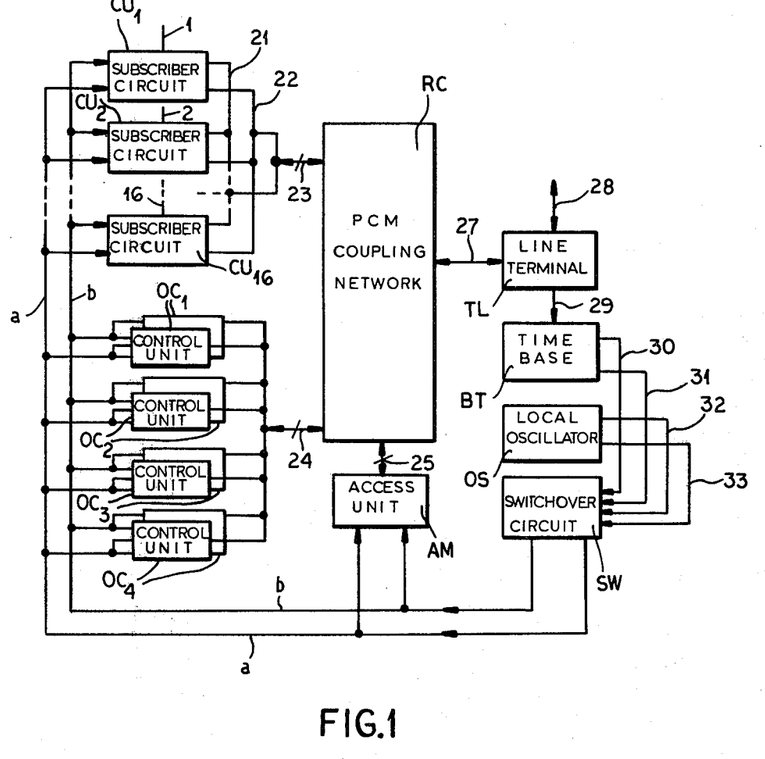
FIG. 1 is a block diagram of part of a rural digital telephone exchange embodying my invention.

FIG. 1 shows part of a rural telephone exchange serving a group of widely scattered local subscriber stations subdivided into several subgroups of sixteen stations each, the stations of one such subgroup being connected by lines 1, 2, . . . 16 to respective subscriber circuits $CU_1$, $CU_2$, . . . $CU_{16}$ advantageously having the form of printed-circuit cards. These circuits include analog/digital converters for translating signal and speech currents into binary codes designed for use in a PCM system wherein 8-bit channels follow one another at a rate of substantially 8 kHz, corresponding to 64 kbit/sec. With one voice channel and one signaling channel allotted to each subscriber circuit, up to 2 Mbit/sec will be handled by a PCM coupling network RC connected to circuits $CU_1$–$CU_{16}$ via individual leads 21 for the signaling channels and 22 for the voice channels merging into a 32-lead multiple 23. Network RC is also connected, by way of a multiple 24, to a set of control units $OC_1$–$OC_4$ associated with circuits $CU_1$–$CU_{16}$, each of these control units having at least one identical mate as a "hot" standby. The subscriber circuits and the control units receive synchronizing signals with a period of 125 $\mu$s on a wire a and timing pulses at a cadence of 2 MHz representing respective time slots for communication of the control units with the several subscriber circuits and with one another as more fully described hereinafter.

Wires a and b, originating at a switchover circuit SW, are also connected to an access unit AM which communicates with network RC via a multiple 25 including one lead for each control unit. All the control units $OC_1$–$OC_4$ as well as access unit AM are of the same basic structure described below with reference to FIG. 2.

Coupling network RC is essentially a transitory register with total accessibility. This network is further connected via a two-way path 27 to a conventional line terminal TL which is linked by a similar bidirectional connection 28 with a nonillustrated higher-ranking central office. Sync pulses arriving at terminal TL from the remote central office by way of connection 28 are transmitted on a lead 29 to a local time base BT generating the aforementioned 125-μs synchronizing signals and 2-MHz timing pulses which are fed to switchover circuit SW by way of respective leads 30 and 31. A local oscillator OS generates similar switching signals and timing pulses on respective leads 32 and 33; circuit SW includes a signal detector which switches its inputs from leads 30 and 31 to leads 32 and 33 when time base BT is inoperative for any reason. Components TL, BT, OS and SW are common to all the subscriber circuits, coupling networks and control and access units in the various sections of the rural exchange.

Figure 2:
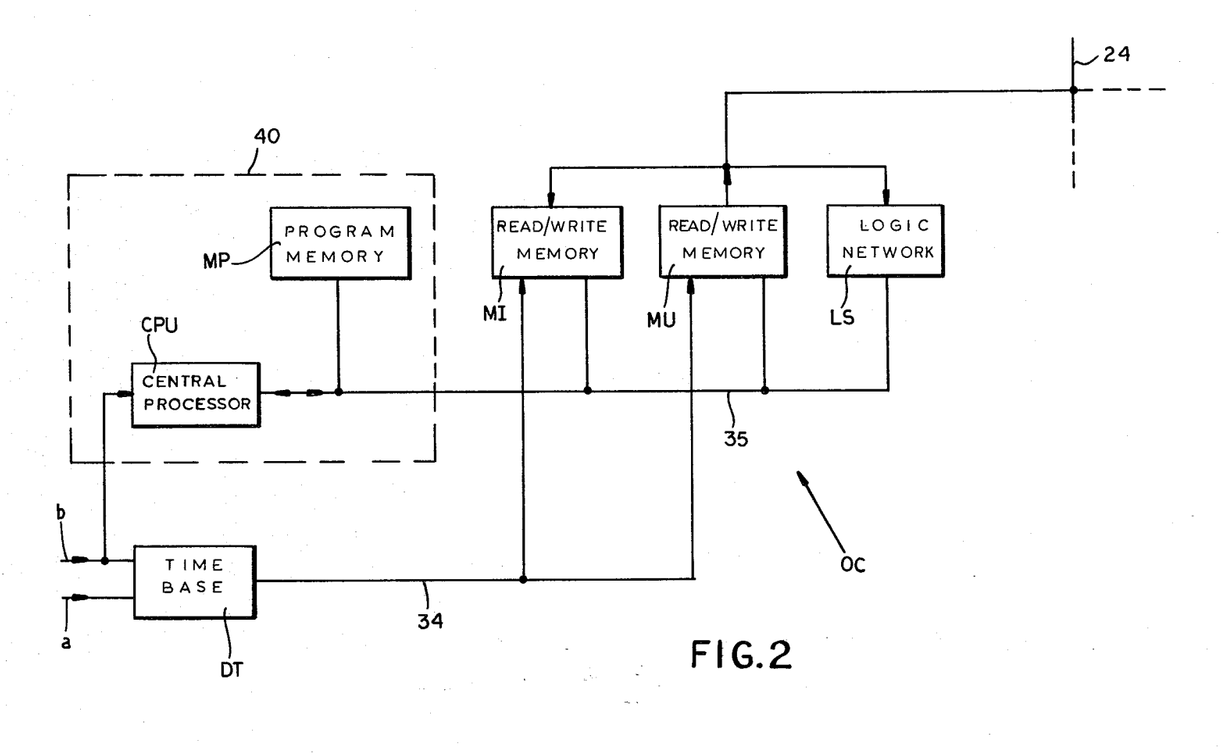
FIG. 2 is a more detailed diagram of a representative control unit included in the exchange of FIG. 1.

In FIG. 2 I have shown a representative control unit OC with an individual time base DT connected to wires a and b, a central processor CPU connected only to wire b, a program memory MP integrated with processor CPU in a common chip 40, a read/write memory MI for the storage of incoming signals, a similar memory MU for the storage of outgoing signals, and a logic network LS connected in parallel with memories MP, MI and MU to an input/output bus 35 of the processor. Time base DT controls the message stores MI and MU via a lead 34; these stores are further connected to multiple 24 in parallel with logic network LS. The latter network, serving to identify certain incoming signals such as dial pulses, could be omitted in some of the control units.

Memory MP stores the program of the respective control unit along with data relating to the various phases of a telephone connection monitored by that unit. For the simultaneous handling of calls involving, say, four to eight of the associated subscriber stations connected to circuits $CU_1$–$CU_{16}$, memory MP must have a storage capacity of about two to three kbytes or 16 to 24 kbits. Memories MI and MU should be able to store a certain number of data words carried in a recurrent PCM frame on one or more of the 64-kbit/sec channels assigned to the local subscriber stations. In the case of memory MI, these words arrive from subscriber circuits $CU_1$–$CU_{16}$ or from other control units; in the case of memory MU they are emitted by processor CPU.

The several control units $OC_1$–$OC_4$ all perform different but mutually complementary functions in the establishment or termination of a telephone connection involving a local subscriber. Each unit, through channels allotted to it, dialogues with other units of the same set or with associated subscriber circuits by way of coupling network RC. More particularly, a unit of type $OC_1$ may detect a line seizure by a calling subscriber and store emitted dial pulses to establish the desired connection. A unit of type $OC_2$ may register the identities of the calling and called stations and measure the duration of the call for the computation of charges. A unit of type $OC_3$ may intervene in the establishment of a local connection and monitor the progress of the conversation, whereas a unit of type $OC_4$ may do the same for long-distance calls. Access unit AM emits supervisory signals or commands to the organs involved in the establishment of the connection.

I shall now describe the operation of the various units in detail with reference to FIGS. 3a–3d and 4. These operations, of course, are timed by the signals arriving over wires a and b to take place in the allotted PCM channels.

Figure 3A:
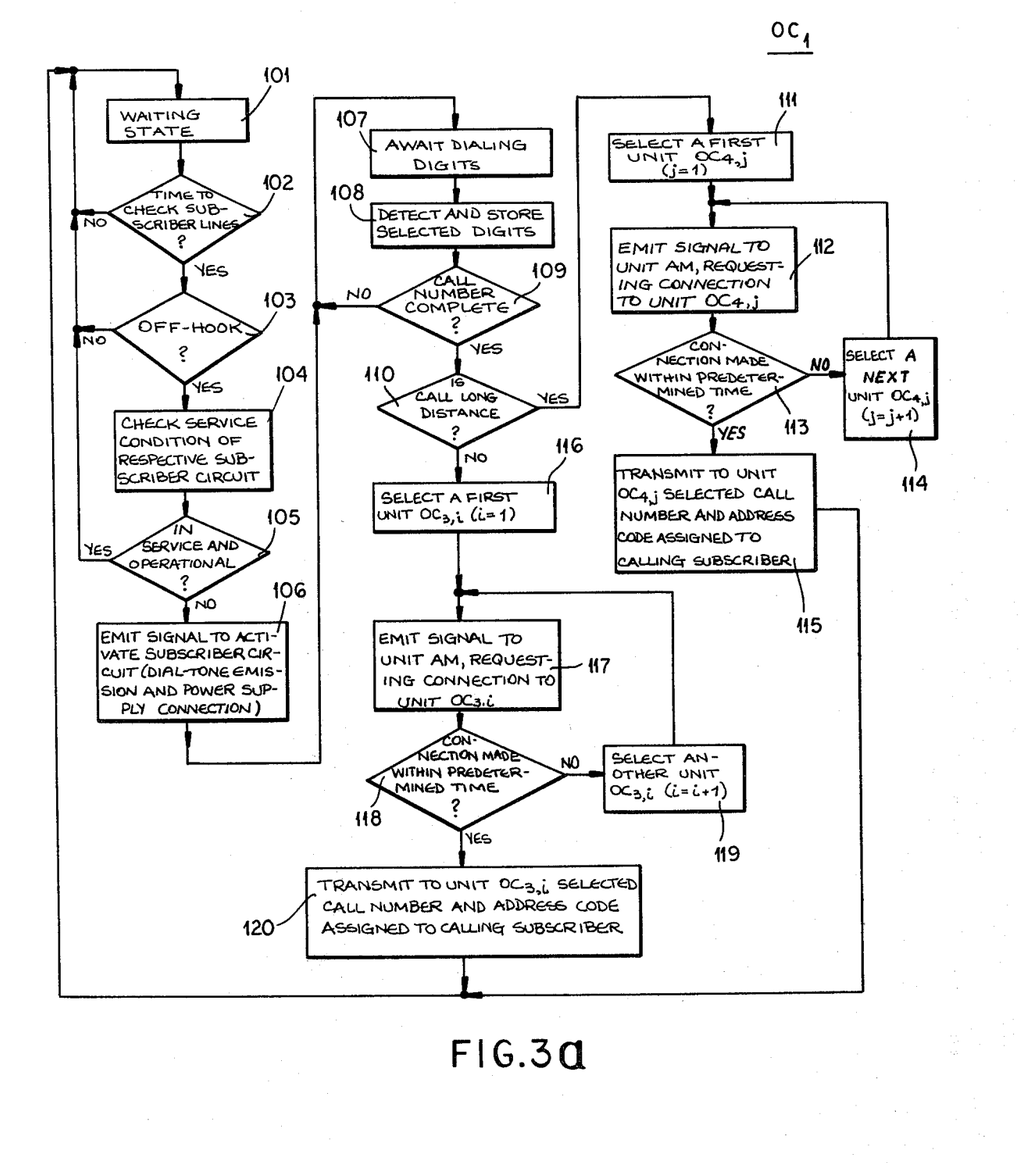
FIGS. 3a–3d are flow charts illustrating the operation of respective types of control units.

From a waiting state 101, an active control unit $OC_1$ periodically checks in an inquiry 102 whether a recurrent time interval in a PCM frame has arrived for the testing of the subscriber lines assigned to this control unit. Upon discovering at 103 that a local subscriber has lifted the receiver off its hook, unit $OC_1$ determines the condition of the respective subscriber circuit (step 104). If this circuit is in a dormant or de-energized state, as determined at a decision junction 105, a signal is emitted at 106 to activate the subscriber circuit, i.e. to connect that circuit to its power supply and to enable it to emit a dial tone to the associated subscriber station; otherwise, i.e. if the off-hook condition is due to an incoming call, state 101 is re-established.

From state 106 the control unit $OC_1$ enters a waiting state 107 in which selected digits are detected and stored in the unit's memory MP (step 108). Upon determining at a junction 109 that digit selection has been completed, unit $OC_1$ engages in an inquiry 110 into the general location of the called station. If the call is long-distance, unit $OC_1$ initiates a sequence of steps 111–114 for establishing, with the aid of access-control unit AM, a connection in network RC to an active unit $OC_4$ controlling communication with the higher-ranking central office reached via link 28 (FIG. 1). Upon the establishment of that connection, unit $OC_1$ transmits to the control unit $OC_4$ linked thereto the selected call number and an address code identifying the calling subscriber station (step 115). If the call is a local one, unit $OC_1$ enters a cycle 116–119 similar to sequence 111–114 for establishing a connection to an active unit $OC_3$ serving in part to discover an available path linking the calling and called subscriber stations; upon the completion of such a connection, unit $OC_1$ transmits to the communicating control unit $OC_3$ the dialed call number and the address code of the calling subscriber station (step 120). The transmission of the identities of the calling and the called subscriber terminates the operations of control unit $OC_1$ concerning this particular telephone call, the unit then returning to the waiting state 101.

Figure 3B:
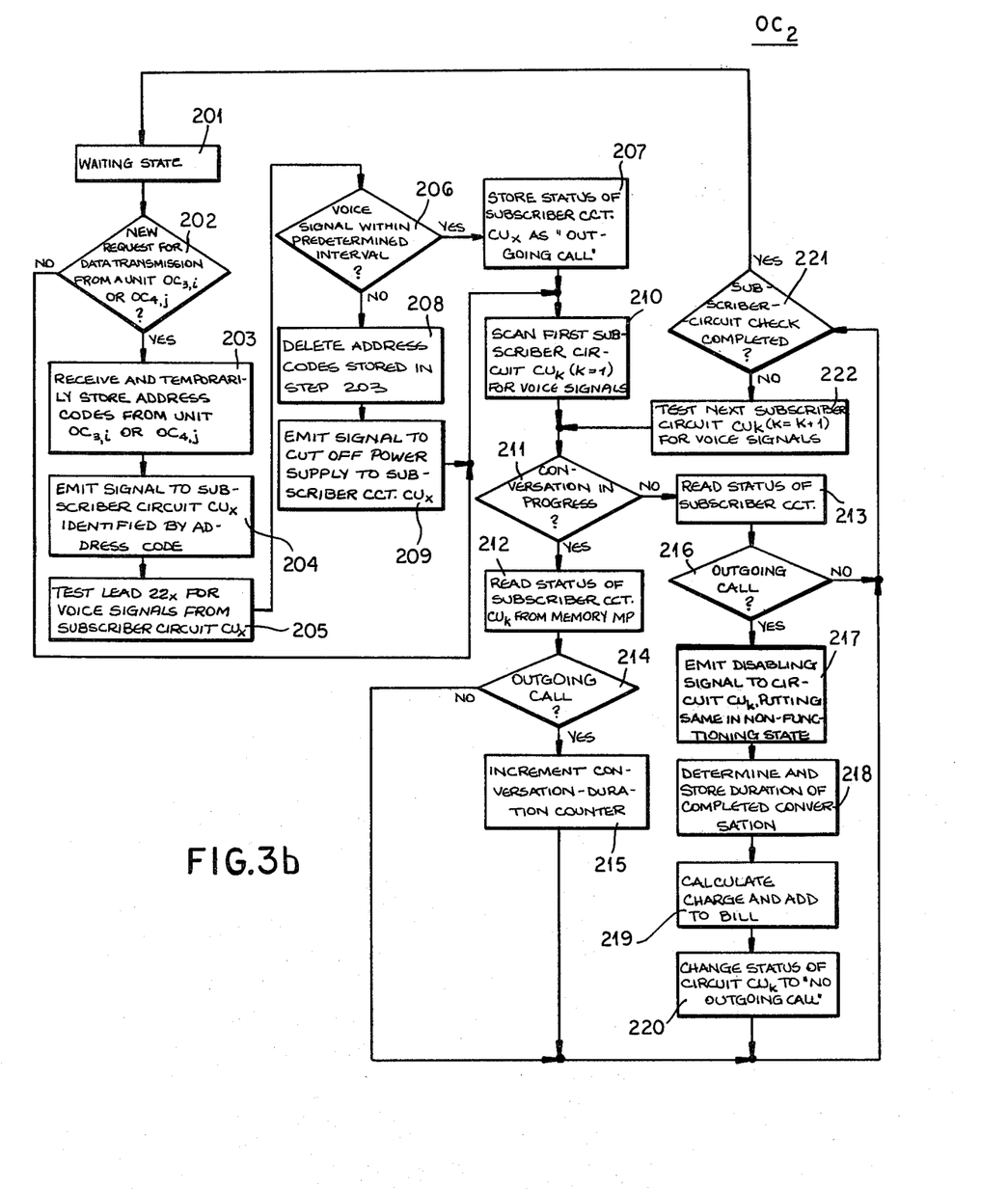

As illustrated in FIG. 3b, an active control unit $OC_2$ periodically leaves a waiting state 201 to inquire at 202 whether a new request for data transmission has arrived via access unit AM from a path-selecting unit $OC_3$ or $OC_4$. If there is such a request, unit $OC_2$ receives and temporarily stores in a step 203 the address codes of the calling and called subscriber stations emitted by the active unit $OC_3$ or $OC_4$. In two succeeding steps 204 and 205, unit $OC_2$ emits a signal to the calling subscriber circuit $CU_x$, enabling voice transmission thereby, and tests the corresponding lead $22_x$ in multiple 23 (FIG. 1) for the presence of speech currents. If voice signals are generated on that lead within a certain time interval or number of PCM frames, as determined at a decision junction 206, unit $OC_2$ stores in its memory MP (FIG. 2) the status of the subscriber circuit $CU_x$ as "outgoing call" (step 207). If no voice signal is detected within such an interval, unit $OC_2$ in a step 208 registers the call as aborted (by deleting the address codes stored in step 203) and in a step 209 cuts off the power supply to circuit $CU_x$.

Upon the completed processing of new data-transmission requests, i.e. upon a negative response to inquiry 202 or upon the implementation of step 207 or 209, unit $OC_2$ scans in a step 210 a first local circuit $CU_k$ (k=1) for the presence of voice signals for the associated subscriber and reads in a step 212 or 213 the stored status of this circuit $CU_k$ from memory MP. If a conversation is actually in progress, as decided at a junction 211, and if the registered status of circuit $CU_k$ is "outgoing call," as determined at a subsequent decision junction 214, unit $OC_2$ increments in a step 215 a conversation-duration counter assigned to the monitored subscriber circuit $CU_k$.

The detection of an absence of voice signals at 211 and the discovery in an inquiry 216 of a stored "outgoing call" status of the monitored subscriber circuit $CU_k$ leads to a sequence of steps 217-220 in which a disabling signal is emitted by unit $OC_2$ to the subscriber circuit for deactivating same, i.e. for cutting off its power supply, the duration of the completed conversation is determined and stored, the charge for the call is calculated and summed with prior charges, and the status of the circuit $CU_k$ is changed to "no outgoing call." Upon a negative outcome to inquiry 214 or 216, or upon the completion of step 215 or 220, unit $OC_2$ inquires at 221 whether the subscriber circuits CU under its supervision have all been checked. When such checking is finished, unit $OC_2$ returns to waiting state 210; if the checking is not yet finished, unit $OC_2$ tests in a step 222 the next subscriber circuit $CU_k$ (k=k+1) for the presence of voice signals and recommences a status-verification sequence consisting of steps 212-220.

Figure 3C:
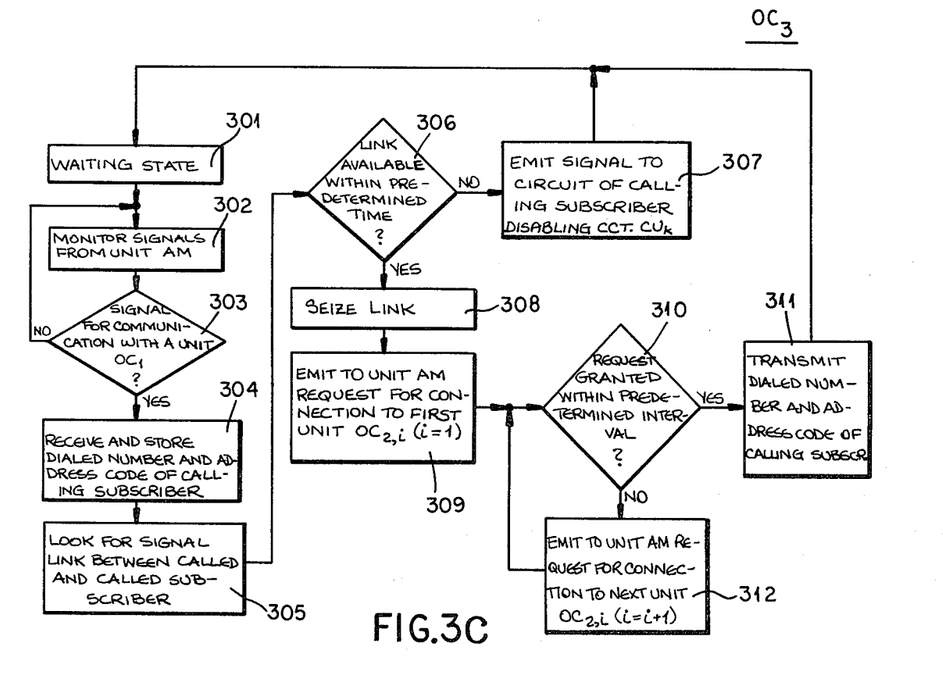

As indicated in FIG. 3c, an active control unit $OC_3$ periodically leaves a waiting state 301 to monitor signals from access unit AM in a step 302. If, at a decision junction 303, unit $OC_3$ discovers that a signal is being emitted by unit AM to indicate the presence of a transmission request from a current-detecting unit $OC_1$, according to step 116 of FIG. 3a, unit $OC_3$ receives therefrom and stores a selected call number and the address code of the calling subscriber (step 304) and scans coupling network RC for possible signal links between the calling and the called subscriber (step 305). If, on the one hand, an available link is not discovered within a predetermined interval as measured by a certain number of PCM frames (junction 306), unit $OC_3$ emits in a step 307 a disabling signal to the circuit CU of the calling subscriber for deactivating that circuit. If, on the other hand, an available link is found, unit $OC_3$ seizes the link in a step 308 and emits to unit AM in a step 309 a request for connection to a unit $OC_2$. Upon the granting of the request within a predetermined time interval, as verified by unit $OC_3$ in an inquiry 310, this unit transmits in a step 311 the selected call number and the address code of the calling subscriber to the assigned unit $OC_2$ and returns to the waiting state 301. If the request sent to unit AM is not granted thereby within the predetermined interval, unit $OC_3$ requests unit AM to connect it to another unit $OC_2$ (step 312).

Figure 3D:
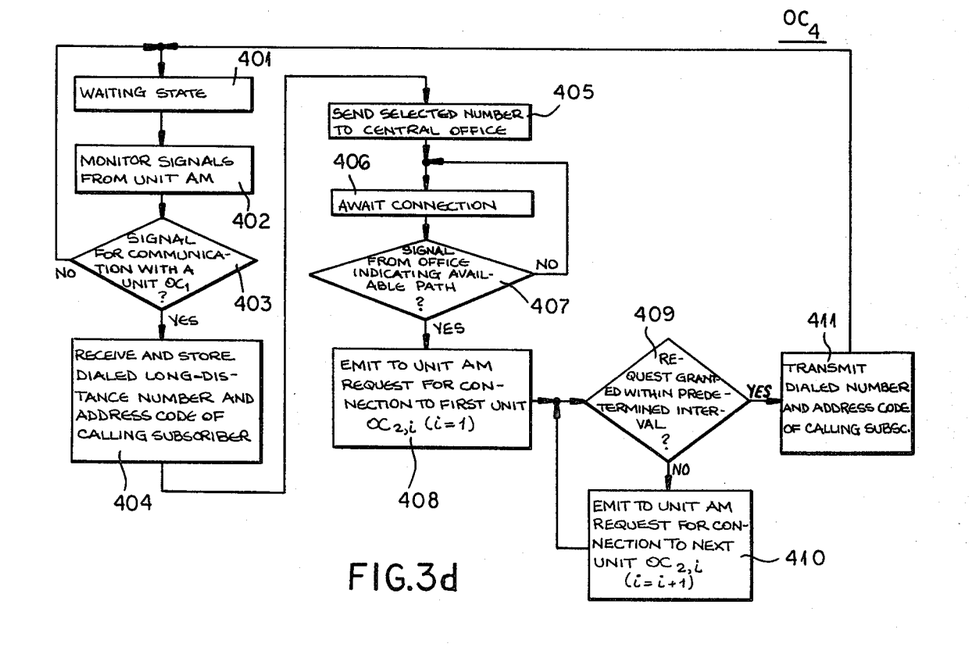

As shown in the flow chart of FIG. 3d, an active control unit $OC_4$ periodically leaves a waiting state 401 to monitor at 402 a signal due to a request from a unit $OC_1$ for information transmission, according to step 111 of FIG. 3a; unit $OC_4$ prepares itself to receive and store a selected long-distance number and the address code of the dialing subscriber (step 404). Unit $OC_4$ then sends in a step 405 the selected call number to the higher-ranking central office which establishes the necessary link. While in a waiting state 406, unit $OC_4$ monitors signals from the central office (inquiry 407) and, upon receiving notification of an available path, emits in a step 408 a signal to unit AM for requesting a connection to an active unit $OC_{2,i}$ (i=1).

If the request is not granted within a pre-established time or number of PCM frames, as ascertained by unit $OC_4$ in an inquiry 409, a request for connection to another unit $OC_{2,i}$ (i=i+1) is sent to access unit AM in a step 410. Upon the formation of a connection between the requesting unit $OC_4$ and an assigned unit $OC_2$, the former transmits to the latter the selected call number and the address code of the calling subscriber, whereupon unit $OC_4$ returns to waiting state 401.

Figure 4:
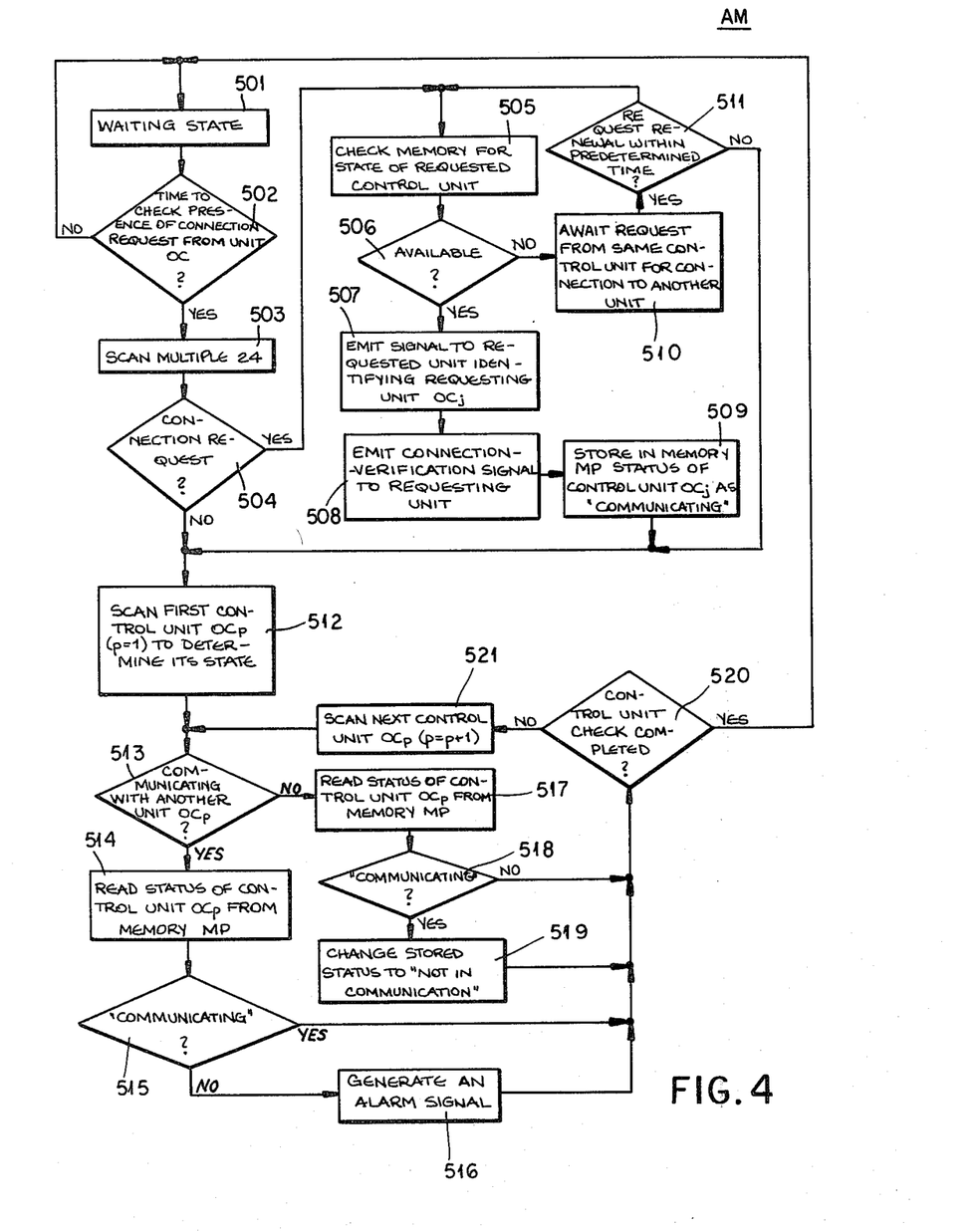
FIG. 4 is a similar flow chart for an access unit also included in the exchange.

As shown in FIG. 4, access unit AM periodically leaves a waiting state 501 to inquire at a decision junction 502 whether a recurrent time interval in a PCM frame has arrived for checking the presence of connection requests from control units $OC_1$–$OC_4$. If a scan 503 of multiple 24 discovers the presence of a connection request, as decided by unit AM at a junction 504, this unit first checks its memory in a step 505 for determining the availability of the requested control unit. If the latter unit is indeed available, as found in an inquiry 506, unit AM supplies it in a step 507 with a signal identifying the unit from which the request originates. A connection-verification signal is then emitted to the requesting unit in a step 508 and the status of the two units is entered into the memory MP of unit AM as "communicating" (step 509). If the initially addressed unit of the requested type is not available, e.g. if it is communicating with another unit or if it is out of service, unit AM waits a predetermined interval for the arrival of a new request from the same originating unit for connection to another unit of that type (step 510). If the renewed request is timely received, as discovered at a decision junction 511, unit AM recommences a connection-implementation sequence comprising steps 505-509 or 505, 506, 510.

Upon a negative decision at junction 504 or 511, or upon the completion of step 509, unit AM begins a survey of all associated control units $OC_1$–$OC_4$ by scanning a first such unit $OC_p$ (p=1) to determine whether it is in communication with another unit. If it is indeed connected to another control unit $OC_q$ (q≠p), as determined in an inquiry 513, the stored status of the control unit $OC_p$ is read from memory MP of unit AM (step 514). In the event that the registered status of this unit does not correspond to its detected condition, as decided at a junction 515, an alarm signal is generated in a step 516. If control unit $OC_p$ is not communicating with another control unit $OC_q$ (see inquiry 513) and has a stored status of "communicating," as determined at a decision junction 518, unit AM changes the status to "not in communication" in a step 519. A positive decision at junction 515, a negative decision at junction 518, or the completion of step 516 or 519 leads to an inquiry 520 into the progress of the control-unit survey. If the survey is not finished, unit AM selects in a step 521 the next control unit in the series and resumes the status-verification sequence 513-519; when the survey is completed, unit AM returns to its waiting state 501.

Although only a single access unit AM has been shown in FIG. 1, that unit may be a member of a selfchecking pair of identical components functioning in a master-slave relationship.

The messages exchanged (via coupling network RC) among the several control units advantageously have a format including a "start of message" word, a "unit identification" word, one or more information words, and an "end of message" word. The latter word may also facilitate the usual parity check to verify the correctness of the message.

I claim:

1. In an automatic digital telephone exchange serving a group of associated subscriber stations divided into several subgroups, in combination:
a set of substantially identical control units assigned to each subgroup of subscriber stations and programmed to carry out different but mutually complementary operations in the establishment and termination of a telephone connection involving at least one station of the respective subgroup;
a common PCM coupling network for each set accessible to each of said control units thereof, to the subscriber stations of the respective subgroup, and to terminal means common to said group; and
an access unit for each set responsive to signals from said control units thereof for satisfying requests for connection to said coupling network, said control units communicating with one another via said coupling network under the command of said access unit.

2. The combination defined in claim 1 wherein each of said control units comprises a central processor provided with a program memory, storage means for incoming and outgoing messages, and timing means for operating said program memory and said storage means under the command of a synchronizing unit common to all said control units.

3. The combination defined in claim 2 wherein each of said control units further includes a logic network connected to said central processor and said storage means thereof, said logic network being responsive to special codes individual to the respective control unit.

4. The combination defined in claim 1, 2 or 3 wherein said access unit has a structure substantially identical with that of any of said control units.

5. The combination defined in claim 1, 2 or 3 wherein at least some of said control units have identical counterparts included in said set in a standby mode.

* * * * *